United States Patent [19]

Soedjak

[11] Patent Number: 5,490,994
[45] Date of Patent: Feb. 13, 1996

[54] METHOD OF STABILIZING THE COLOR OF THE DISODIUM SALT OF 5,5'-INDIGOTIN DISULFONIC ACID

[75] Inventor: Helena S. Soedjak, N. Tarrytown, N.Y.

[73] Assignee: Kraft Foods, Inc., Northfield, Ill.

[21] Appl. No.: 281,392

[22] Filed: Jul. 27, 1994

[51] Int. Cl.$^6$ ............................................. A23L 1/275
[52] U.S. Cl. ........................ 426/262; 426/250; 426/265; 426/321; 426/540; 426/573; 426/576
[58] Field of Search ................................. 426/262, 265, 426/321, 250, 540, 575, 573, 576, 578

[56] References Cited

U.S. PATENT DOCUMENTS

| | | | |
|---|---|---|---|
| 3,920,855 | 11/1975 | Dawson et al. | 426/250 |
| 4,139,645 | 2/1979 | Werner | 426/250 |
| 4,442,104 | 4/1984 | Wedral et al. | 426/250 |
| 5,300,310 | 4/1994 | Eisen | 426/540 |
| 5,336,510 | 8/1994 | Chang | 426/72 |

OTHER PUBLICATIONS

Inskip, et al. Spectrophotometric Determination of Gallotannins in Beer, Journal of the AOAC, vol. 56, No. 6, pp. 1362–1364 (1973).

Brune, et al. Determination of Iron–Binding Phenolic Groups in Foods, Journal of Food Science, vol. 56, No. 1, pp. 128–131 (1991).

*Primary Examiner*—Donald E. Czaja
*Assistant Examiner*—Lien Tran
*Attorney, Agent, or Firm*—Thomas R. Savoie; Thomas A. Marcoux

[57] ABSTRACT

The color of the disodium salt of 5,5'-indigotin disulfonic acid (i.e., FD&C Blue No. 2) in aqueous media held in an aluminum container is stabilized by the addition of tannic acids, ortho-phenanthroline, apoferritin.

7 Claims, No Drawings

METHOD OF STABILIZING THE COLOR OF THE DISODIUM SALT OF 5,5'-INDIGOTIN DISULFONIC ACID

BACKGROUND OF THE INVENTION

FD&C Blue No. 2, which is chemically known as the disodium salt of 5,5'-indigotin disulfonic acid, is a known blue colorant for foodstuffs. It is also known that the color of Blue No. 2 slowly fades when subjected to light. Due to these problems the use of Blue No. 2 in foods and cosmetics has been limited. One likely use for Blue No. 2 would be to provide a blue color component to foodstuffs which are prepared for consumption from dry mixes. In a dry environment Blue No. 2 is relatively stable. It will not be until the dry mix is reconstituted with water that the instability of Blue No. 2 will be a factor. The use of Blue No. 2 would typically be in fruit-flavored (e.g., blueberry or grape) foodstuffs which will have a pH of less than 4.5, a pH which will accelerate the loss of the color. If however acidic, Blue No. 2-containing foodstuffs were consumed quickly and/or kept away from extended periods of light after preparation, such as in a refrigerator, the use of Blue No. 2 in these foodstuffs could be tolerated. The use of Blue No. 2 in powdered mixes for dessert gels has been thought to be suitable. A combination of Blue No. 2 and Red No. 40 produces a purple color which is well-regarded for use in grape-flavored dessert gels.

DESCRIPTION OF THE INVENTION

It has been found that when Blue No. 2 is used as a colorant in dry mixes for preparing gelled foodstuffs, such as acidic, fruit-flavored dessert gels, the color component provided by Blue No. 2 is stable during typical use cycles which usually do not extend beyond three days, so long as the gel is stored in non-aluminum containers, such as plastic, glass or steel. However, when the gel is stored in an aluminum container, such as a pan or mold, the blue color component provided to the gel by Blue No. 2 fades away within a few hours.

This invention is directed towards the finding that the addition of certain compounds which have been found to be complexing agents for metal ions and/or the addition of certain soluble protein compounds which have been found to be complexing agents for Blue No. 2 will stabilize the blue color component in acidic media, such as foodstuffs, when the foodstuff is stored in aluminum containers. Suitable as complexing agents for metal ions are tannic acids, ortho-phenanthroline and apoferritin. Suitable as soluble, protein complexing agents for Blue No. 2 are serum albumin and egg protein.

For the metal ion complexing agents of this invention, the use level on a weight ratio basis to Blue No. 2 will be 0.5–5.0:1. The preferred level for ortho-phenanthroline and apoferritin will be 1.0–5.0:1 while the preferred level for tannic acids will be a 0.5–3.0:1. At this use level tannic acids will be present in the foodstuff at below its taste threshold level.

The tannic acids useful in this invention may be derived from any of the well-known sources for this material, such as sumac leaves, tara pods, Chinese and Turkish nut galls, etc. Tannic acid is recognized as a generic term which includes a number of gallotannin-containing mixtures which differ among themselves in chemical composition as well as average molecular weight.

For the soluble, protein compounds of this invention, such as serum albumin, the use level on a weight ratio basis to Blue No. 2 will be 20–120:1. The preferred levels for serum albumin and egg protein will be 30–90:1.

This invention is further described but not limited by the following example.

EXAMPLE 1

Eighty-five grams of grape-flavored gelatin dessert mix containing sucrose, gelatin, adipic acid, disodium phosphate, grape flavor, FD&C Red No. 40 at 77 ppm and FD&C Blue No. 2 at 63 ppm is combined in a glass bowl with 237 ml (one cup) of boiling water and stirred for two minutes. Thereafter, 237 ml (one cup) of cold water is added with stirring. The resulting solution was then poured into an aluminum pan and refrigerated. After one hour the gelatin had set and a purple-colored, grape-flavored gelatin dessert was ready for consumption. After an additional period of four hours of storage in the refrigerator (without light) the color of the gelatin dessert had changed to red. The above process was repeated with the exception that the solution was poured into a glass pan. The purple color was unchanged after three days refrigerator storage.

EXAMPLE 2

Eighty-five grams of the mixture of Example 1 having sumac-derived tannic acid added at a level of 94 ppm (8 mg) was combined with water as in Example 1. The resulting solution was poured into an aluminum pan and placed in a refrigerator. After three days the color was not changed from the original purple color.

Example 2 was repeated using tannic acid derived from Chinese nut gall, Turkish nut gall and tara pods, using ortho-phenanthroline and apoferitin, and using bovine serum albumin and egg protein. Three days of color stabilization was obtained at the levels indicated below.

TABLE

| Stabilizing Agent | Amount (mg) |
| --- | --- |
| Chinese Nut Gall Tannic Acid | 20 |
| Turkish Nut Gall Tannic Acid | 20 |
| Tara Pod Tannic Acid | 20 |
| Ortho-phenanthroline | 12 |
| Apoferritin | 12 |
| Bovine Serum Albumin | 300 |
| Egg Protein | 300 |

Having then described the invention what is claimed is:

1. A method for stabilizing the blue color of a disodium salt of 5,5'-indigotin disulfonic acid in an aqueous fruit-flavored dessert gel having a pH of less than 4.5 and which is contained in an aluminum container by adding to said gel an amount of a complexing agent selected from the group consisting of tannic acids, ortho-phenanthroline, apoferritin and combinations thereof, said complexing agent being added at a weight level of from 0.5–5.0 times the level of the disodium salt of 5,5'-indigotin disulfonic acid, the level of the complexing agent being below its taste threshold level in the gel.

2. The method of claim 1 wherein the complexing agent is a tannic acid and the level is from 0.5 to 3.0 times the level of 5,5'-indigotin disulfonic acid.

3. The method of claim 1 wherein the complexing agent is ortho-phenanthroline and the level is from 1.0–5.0 times the level of 5,5'-indigotin disulfonic acid.

4. The method of claim 1 wherein the complexing agent is apoferritin and the level is from 1.0–5.0 times the level of 5,5'-indigotin disulfonic acid.

5. The method of claim 1 wherein the gel contains a gelling agent selected from the group consisting of gelatin, carrageenan, algin, agar and combinations thereof.

6. The method of claim 1 wherein the gelling agent is gelatin.

7. The method of claim 1 wherein the gel also contains FD&C Red No. 40 at a level effective to produce a purple color in the gel.

* * * * *